United States Patent
Hong et al.

(10) Patent No.: US 12,510,878 B2
(45) Date of Patent: Dec. 30, 2025

(54) PHYSICALLY-INFORMED MULTI-SYSTEM HARDWARE OPERATING WINDOWS

(71) Applicant: Applied Materials, Inc., Santa Clara, CA (US)

(72) Inventors: Jeong Jin Hong, Yongin (KR); Mi Hyun Jang, Seoul (KR); Sidharth Bhatia, Santa Cruz, CA (US); Sejune Cheon, Seoul (KR); Joshua Maher, Sunnyvale, CA (US); Upendra Ummethala, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 308 days.

(21) Appl. No.: 17/745,730

(22) Filed: May 16, 2022

(65) Prior Publication Data
US 2023/0367288 A1  Nov. 16, 2023

(51) Int. Cl.
*G05B 23/00* (2006.01)
*G05B 19/4099* (2006.01)

(52) U.S. Cl.
CPC ............ *G05B 19/4099* (2013.01); *G05B 2219/45031* (2013.01)

(58) Field of Classification Search
USPC ........................................................ 700/121
See application file for complete search history.

(56) References Cited

U.S. PATENT DOCUMENTS

| | | |
|---|---|---|
| 8,527,081 B2 | 9/2013 | Hardy et al. |
| 2007/0224840 A1 | 9/2007 | Renau et al. |
| 2013/0309785 A1* | 11/2013 | Sui .................... H01J 37/32963 422/187 |
| 2014/0340682 A1* | 11/2014 | Kwak .................. G01N 21/274 356/369 |
| 2016/0119615 A1* | 4/2016 | Chang .................. H04N 13/395 348/51 |
| 2018/0210423 A1 | 7/2018 | Yamamoto et al. |
| 2019/0035121 A1* | 1/2019 | Fukagawa ............... G06T 19/00 |
| 2020/0333774 A1 | 10/2020 | Banna |
| 2022/0035979 A1 | 2/2022 | Moffatt et al. |
| 2022/0334172 A1* | 10/2022 | Hayakawa ......... G05B 23/0281 |
| 2022/0374572 A1* | 11/2022 | Sawlani ................. G06N 20/00 |
| 2023/0049157 A1* | 2/2023 | Sawlani ............ G05B 13/0265 |

FOREIGN PATENT DOCUMENTS

WO  2021044611 A1  3/2021

OTHER PUBLICATIONS

International Search Report and Written Opinion for PCT/US2023/018817 dated Aug. 4, 2023, 11 pgs.
International Preliminary Report on Patentabilty for PCT/US2023/018817, dated Nov. 28, 2024, 8 pgs,.

* cited by examiner

*Primary Examiner* — Emilio J Saavedra
(74) *Attorney, Agent, or Firm* — Schwabe, Williamson & Wyatt, P.C.

(57) ABSTRACT

Embodiments disclosed herein include a method for use with a semiconductor processing tool. In an embodiment, the method comprises configuring the semiconductor processing tool, running a benchmark test on the semiconductor processing tool, providing hardware operating window (HOW) analytics, generating a design of experiment (DoE) using the HOW analytics, implementing process optimization, and releasing an iteration of the process recipe. In an embodiment, the method further comprises margin testing the iteration of the process recipe.

17 Claims, 7 Drawing Sheets

PHYSICALLY-INFORMED MULTI-SYSTEM HARDWARE OPERATING WINDOWS

BACKGROUND

1) Field

Embodiments relate to the field of semiconductor manufacturing and, in particular, systems for determining hardware operating windows for use during design of experiment (DOE).

2) Description of Related Art

The process of manufacturing semiconductor devices can require many sequential process operations, accounting for hundreds or even thousands of process variables. Further, tools used to carry out the process operations have various specifications, limitations, and requirements that add further variables to the manufacturing process. Thus, process engineers produce semiconductor process recipes (referred to as simply "recipes" herein for simplicity) that dictate the process operations and how such process operations are to be performed for each tool used in the semiconductor manufacturing process.

An incorrect recipe can result in poor results and possibly even damage to the wafers being processed or the tool itself. The allowable operating window for a given tool may be well-defined, but also quite complex. Due to such complexity, process engineers can mistakenly create a recipe that is incorrect in some way or otherwise falls outside of the defined operation window of the tool. Thus, recipes must be validated before they are used during manufacturing process runs.

Additionally, individual subsystem operating limits may cause chamber damage or prevent plasma striking if recipe conditions are significantly changed. That is, even well-defined process windows may not accurately map the safe operating conditions of the chamber. During design of experiment (DoE) for the generation of a new recipe, the DoE should be optimized to limit process runs that may lead to damage to the tool and/or the wafer. Accordingly, an improved process for generating recipes is desired.

SUMMARY

Embodiments disclosed herein include a method for use with a semiconductor processing tool. In an embodiment, the method comprises configuring the semiconductor processing tool, running a benchmark test on the semiconductor processing tool, providing hardware operating window (HOW) analytics, generating a design of experiment (DoE) using the HOW analytics, implementing process optimization, and releasing an iteration of the process recipe. In an embodiment, the method further comprises margin testing the iteration of the process recipe.

Embodiments may also include a method of developing a process recipe for a semiconductor processing tool. In an embodiment, the method comprises incorporating prior data recorded by the semiconductor processing tool into a system, generating a hardware operating window (HOW) model, and exploring the HOW model. In an embodiment, exploring the HOW model comprises, generating a design of experiment (DoE) to fill gaps in the HOW model, and applying tool constraints to the DoE to generate a ranked DoE, wherein the ranked DoE is used to identify the process recipe.

Embodiments may also include a non-transitory computer readable medium having instructions stored thereon that, when executed by a processor, cause the processor to perform a method of validating a semiconductor process recipe, comprising generating a high-dimensional visualization using a hardware operating window (HOW) model, wherein the high-dimensional visualization comprises an operational window, and determining if the semiconductor process recipe is within the operational window.

DETAILED DESCRIPTION

Systems described herein include systems for determining hardware operating windows. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Figure 1A:
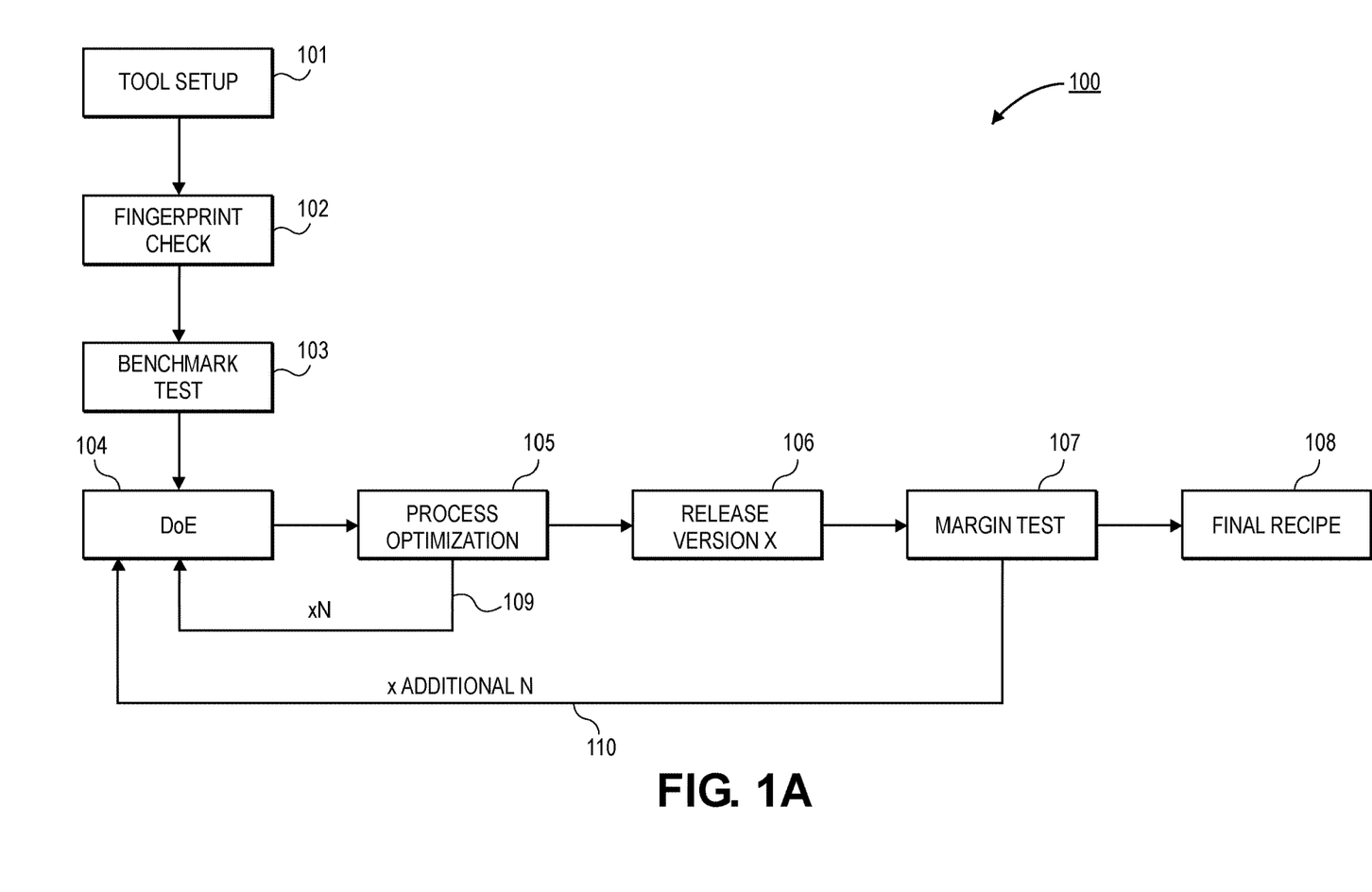
FIG. 1A is a process flow diagram of a typical development process for the generation of a semiconductor processing recipe, in accordance with an embodiment.

To provide context for the discussion below, FIG. 1A is a process flow diagram of a typical recipe development process 100. As shown, the process may begin with tool setup 101. The tool setup 101 may include configuring the tool for a certain process operation. For example, an etching tool may be configured for a bias etch process or a source etching process. Those skilled in the art will readily appreciate that processing tools in the semiconductor manufacturing industry may include many different variables that can be configured in order to process substrates (e.g., wafers) in a given manner.

In FIG. 1A, the recipe development process 100 may continue with fingerprint checking 102. The fingerprint checking 102 may be a process used to determine if the processing tool is operating similar to other processing tools that may be used to implement the recipe. The fingerprint checking 102 may indicate if seasoning layers are present and whether they have the right thicknesses and/or material composition. The fingerprint checking 102 may also determine if the processing tool is sufficiently clean in order to execute a desired process.

After the fingerprint checking 102, a benchmark test 103 may be executed. The benchmark test 103 may be a process recipe that is similar to the recipe under development. The benchmark testing 103 may be used to generate data that can subsequently be used in order to the develop the DoE.

In an embodiment, the operations 101-103 may be executed on a processing tool that is different from the processing tool used to execute the DoE. For example, the processing tool for operations 101-103 may be at a first location (e.g., in a first fab environment), and the processing tool for the operations 104-108 may be at a second location (e.g., in a second fab environment). Though, it is to be appreciated that operations 101-103 and operations 104-108 may be implemented in the same fab environment or even on the same processing tool.

In an embodiment, the process 100 may continue with operation 104 which includes constructing a DoE. The DoE may include a systematic analysis of a process recipe that includes changing multiple variables in order to see how the different variables interact with each other in order to process the wafer. Following the DoE, process optimization 105 may occur. The process optimization may include looking at the results of the DoE and reworking the DoE in order to investigate a more targeted area of the process window. This DoE 104 and process optimization 105 process may be repeated xN iterations as indicated by the loop 109. That is, a loop of the DoE process 104 and the process optimization 105 may be repeated two or more times.

After the DoE 104 and process optimization 105 loop has provided a desired result, a first version of the process recipe is released at operation 106. The first version of the process recipe may then be tested with a margin test 107. The margin test 107 may include running the first version of the process recipe a plurality of times. For example, the first version of the process recipe may be run 100 times or more. The results of the margin test are then analyzed in order to determine if the first version of the process recipe was successful.

In some embodiments, the margin test 107 may fail. The failure of the margin test may be the result of hardware stability issues. That is, despite being within a predetermined operating window of the tool, the specific conditions of the first version of the process recipe may result in some hardware issue. In such instances, the process 100 loops back to the DoE along line 110.

It is to be appreciated that the discovery of a hardware issue at the margin test 107 results in significant losses in research and development (R&D) time, as well as adding additional cost to the R&D process. Once the loop is continued and a second version (or another subsequent version) of the process recipe passes the margin test at 107, the final recipe 108 can be used for manufacturing production wafers.

Accordingly, there is significant risk in running the process recipe development process 100 when a full understanding of the process and hardware operating window is not known. As such, embodiments disclosed herein include the use of hardware operating window (HOW) analytics in order to better understand the true operating window of a processing tool.

Figure 1B:
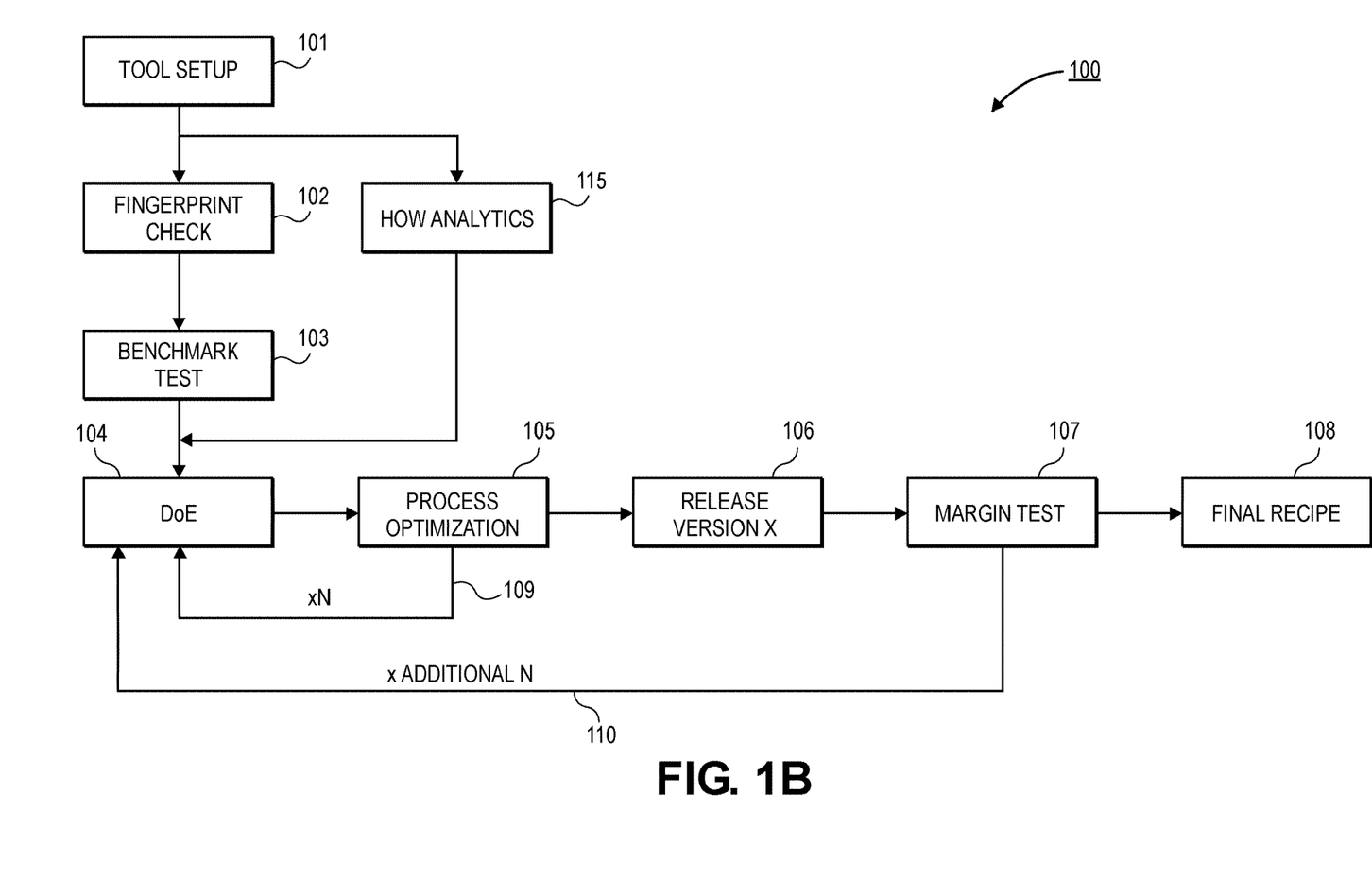
FIG. 1B is a process flow diagram of a development process for the generation of a semiconductor processing recipe using hardware operating window (HOW) analytics before the design of experiment (DoE), in accordance with an embodiment.

Referring now to FIG. 1B, a process flow diagram of a recipe development process 100 that includes HOW analytics is shown, in accordance with an embodiment. The recipe development process 100 in FIG. 1B may be substantially similar to the recipe development process 100 in FIG. 1A with the exception of the addition of HOW analytics 115. In an embodiment, the HOW analytics 115 may be implemented substantially in parallel with the fingerprint check 102 and the benchmark testing 103. In some embodiments, one or both of the fingerprint check 102 and the benchmark testing 103 may be used to generate data that can be incorporated into the HOW analytics 115.

In an embodiment, the HOW analytics 115 may be used to analyze processing tool operation behaviors in order to evaluate the hardware operating window. That is, instead of relying on tribal knowledge and extensive lab experimentation, processes can be implemented in order to more accurately define the hardware operating window. By knowing the limits of the hardware before developing the DoE, a more streamlined process can be provided that reduces the chance of failure at the margin test 107 due to hardware stability issues. A more detailed explanation of the HOW analytics 115 and how they are implemented is described in greater detail below.

The HOW analytics 115 may result in the generation of one or more high-dimensional visualizations that can be utilized in recipe development operations. Examples of such high-dimensional visualizations are shown in FIG. 2A and FIG. 2B.

Figure 2A:
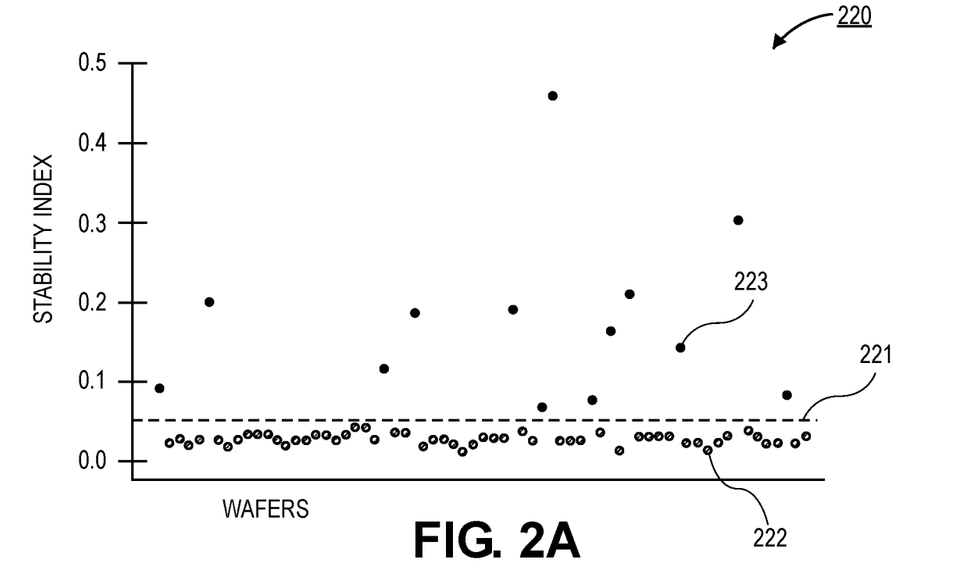
FIG. 2A is a graph of the stability index of a plurality of wafers, in accordance with an embodiment.

FIG. 2A is a graph 220 of the stability index of a plurality of wafers, in accordance with an embodiment. Each dot 222 or 223 on the graph indicates the stability index of a given wafer that is processed. Ideally, the stability index is close to 0.0. However, a relatively stable process is indicated when the stability index is below line 221, which may be set at approximately 0.05. Dots 223 above the line 221 may indicate unstable processing environments. That is, tool settings for the wafers 223 may be outside the hardware operating window.

Figure 2B:
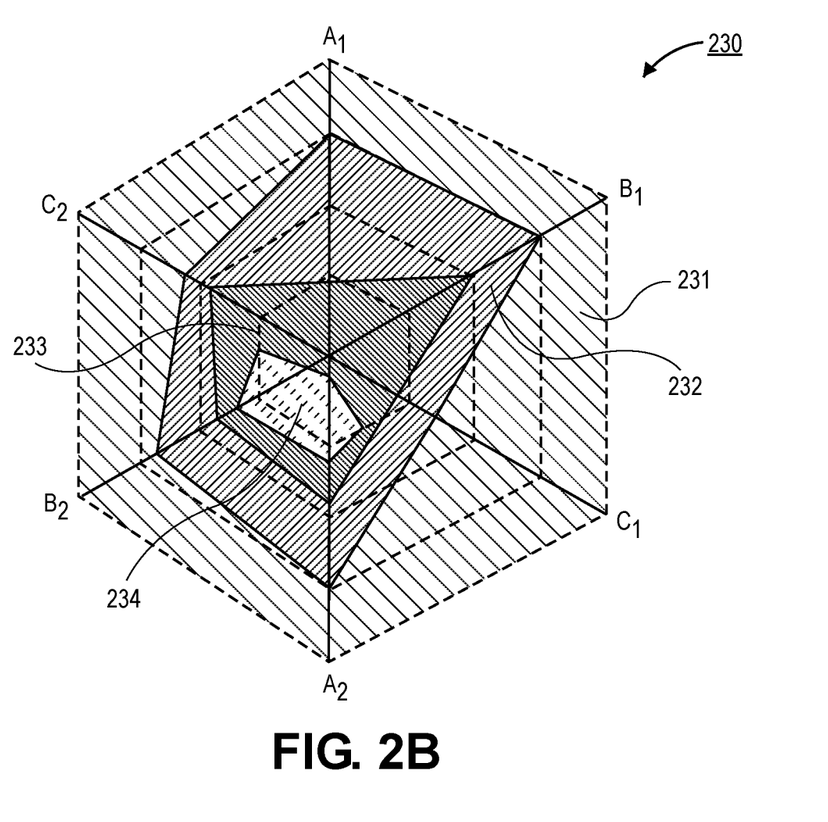
FIG. 2B is a high-dimensional visualization of the process window using HOW analytics, in accordance with an embodiment.

Referring now to FIG. 2B, a HOW map 230 is shown, in accordance with an embodiment. The HOW map 230 may map a plurality of process parameters. For example, process parameters A, B, and C are shown. Though, it is to be appreciated that fewer or more process parameters may be included in other embodiments. Each process parameter A, B, C, includes a maximum value (e.g., $A_1$) and a minimum value (e.g., $A_2$). In an embodiment, the region 231 may represent a set of component specifications for a processing tool. That is, anywhere within the region 231 may be expected to be within the known processing window of the given tool. However, through the use of HOW analytics, a smaller processing window 232 may be determined. The processing window 232 may be referred to as the operational window. That is, any recipe with parameters within the processing window 232 may be expected to not lead to hardware stability issues. In an embodiment, an optimal hardware operating window 233 may also be provided. The optimal hardware operating window 233 may indicate that there is an even lower chance of hardware stability issues. As shown, a process recipe 234 may be entirely within the optimal hardware operating window 233. However, in other embodiments, the process recipe 234 may also extend into the processing window 232. In other embodiments, the high-dimensional visualization may also be a multi-dimensional map of hardware constraints, a visualization of the DoE runs, or an experimental evaluation in N-dimensional space.

Figure 3:
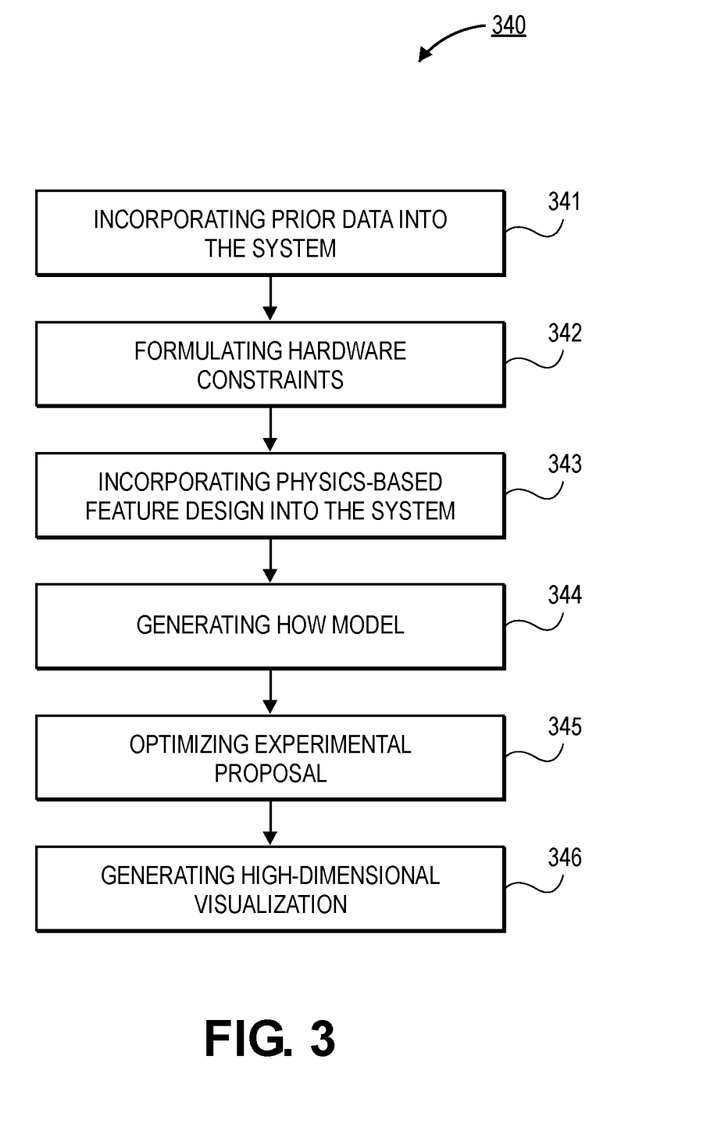
FIG. 3 is a process flow diagram of a process for integrating HOW analytics for a recipe development operation, in accordance with an embodiment.

Referring now to FIG. 3, a process flow diagram of a process 340 for implementing HOW analytics in a recipe development environment is shown, in accordance with an embodiment. In an embodiment, the process 340 may begin with operation 341, which comprises incorporating prior data into the system. The prior data may be the result of fingerprinting and/or benchmark testing. In some embodiments, the prior data may be data from outside the recipe development process. For example, prior data may be data from operating a process tool in previous months or even years prior to the particular recipe development process. In an embodiment, the system may refer to a database that is used by the HOW analytics module. In an embodiment, the prior data may be used to identify critical DoE input parameters and/or output parameters (e.g., reflected power, arcing events, or the like).

In an embodiment, process 340 may continue with operation 342, which comprises formulating hardware constraints. The hardware constraints may be physical limits that are known for the particular tool being investigated. For example, the hardware constraints may correspond to the region 231 shown in FIG. 2B. In an embodiment, the hardware constraints may be any constraint type. In one embodiment, min-max constraints may be one example of the hardware constraint. For example, an electrostatic chuck (ESC) voltage may need to be between values a and b, or a bias needs to be above a value c. In another embodiment, the hardware constraints may include a linear constraint. For example, $\alpha * Bias + \beta * ESC_v > c$. In yet another embodiment, the hardware constraints or physics based constraints may include non-linear constraints, such as, $\log(P) + 1/Bias > d$.

The use of hardware constraints allows for the allowable process window to be shrunk. As such, a smaller space needs to be investigated in order to implement the HOW analytics. This save computational effort and can also reduce the number of parameters in the DoE that need to be investigated. This can save R&D costs and leads to a more streamlined recipe development process. In an embodiment, the hardware constraints may be based on existing knowledge of the processing tool, or based on previous experimentation on the processing tool.

In an embodiment, the process 340 may continue with operation 343 which comprises incorporating physics-based feature design into the system. The physics-based feature designs may include physical models, reduced order models (ROMs) or the like. The physics-based feature designs may incorporate physics relationships between various parameters. For example, a physics relationship like a Paschen breakdown voltage chart may be used to narrow the range of pressures and/or voltages that need to be investigated. It is to be appreciated that any physics based model or ROM may be used. For example, plasma based models (e.g., Paschen breakdown voltage, Debye length, ion energy distribution function (IEDF), etc.), thermal based models (e.g., ESC temperature, lid temperature, wall temperature, etc.), and/or fluidic flow models (e.g., boundary layer, pressure uniformity, etc.) can be used.

In an embodiment, process 340 may continue with operation 344, which comprises generating a HOW model. In an embodiment, the HOW model may be generated using a Gaussian process regression (GPR) model, a generalized linear model (GLM), machine learning (ML), or physics informed machine learning (PIML). While two examples of models are included, it is to be appreciated that embodiments are not limited to such modeling techniques, and any suitable model may be used, in accordance with various embodiments. In an embodiment, the HOW model can be used to identify the areas where there is sufficient data to provide a strong confidence interval for a given value. Additionally, the model may illustrate where there are gaps in the knowledge of the system. The locations of the gaps in knowledge can be utilized in subsequent processing operations in order to generate a DoE to fill in the gaps. In an embodiment, the HOW model may be generated from data in the system (e.g., a database) that has been refined through the use of the hardware constraints and the physics-based models. The HOW model may provide a model that accurately maps known conditions while highlighting areas where additional information is needed.

In an embodiment, the process 340 may continue with operation 345, which comprises optimizing an experimental proposal. In an embodiment, the optimization process involves building a DoE that fills in the remaining gaps of the HOW model. In a particular embodiment, the optimizing may include a classical DoE design. For example, partial factorial DoE or response surface methodology (RSM) may be used to build the DoE. In other embodiments, space filling DoE processes may be used. For example, Latin hyper cube (LHC) space filling may be used in some embodiments.

In an embodiment, the process 340 may continue with operation 346, which comprises generating a high-dimensional visualization. The high-dimensional visualization may incorporate data obtained from the DoE designed in operation 345 as well as data from the database of the system. As such, a more filled out model of the operating window can be obtained compared to just using the preexisting data incorporated in operation 341. In an embodiment, the high-dimensional visualization may be similar to the HOW map shown in FIG. 2B, or the stability index shown in FIG. 2A. Embodiments, may also include response surface diagrams, or dimensionally reduces spatial/manifold visualizations. Such high-dimensional visualizations allow for a process engineer to easily compare a desired process recipe to the mapped out hardware operating window.

Figure 4:
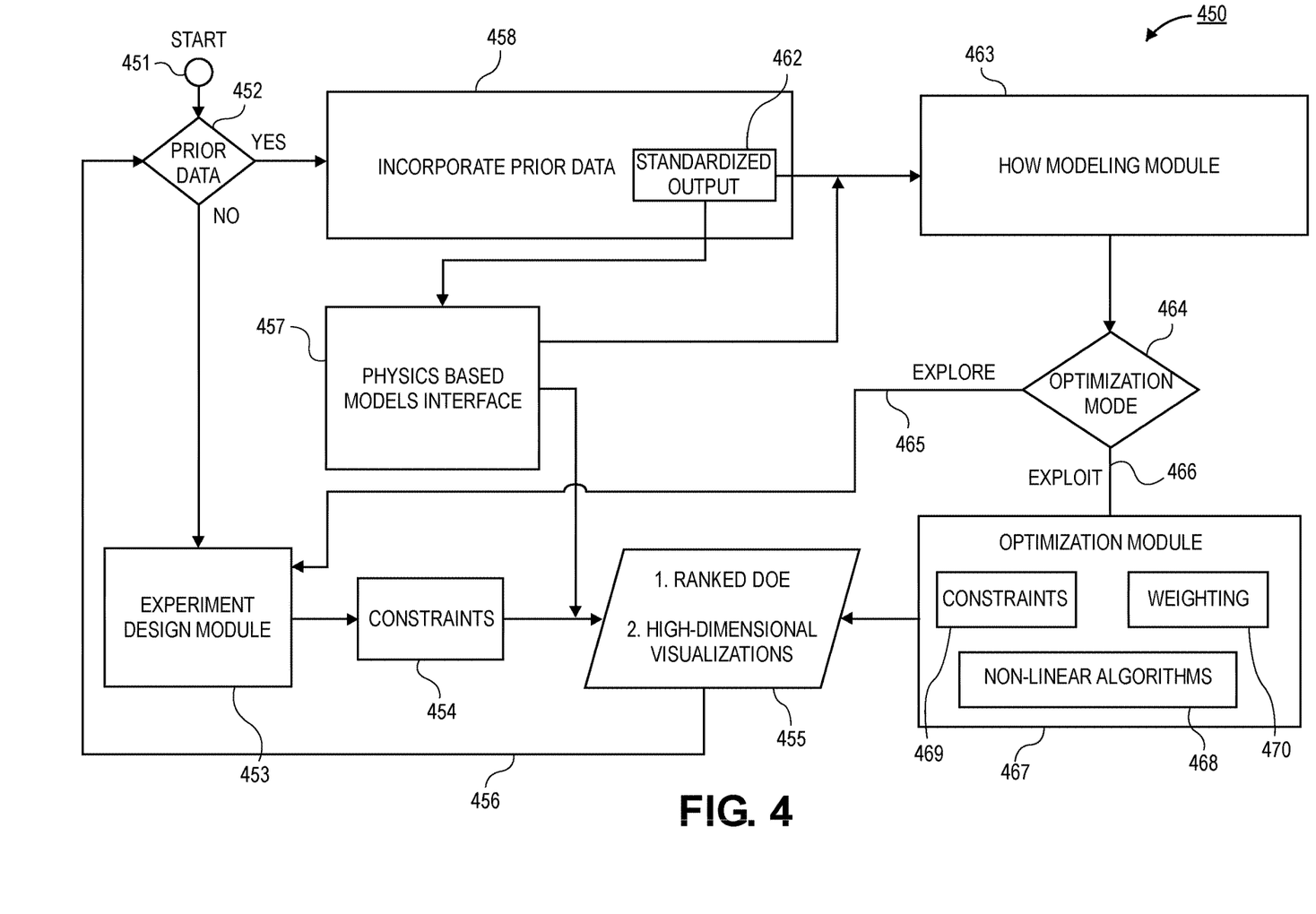
FIG. 4 is a process flow diagram depicting the use of HOW analytics in a recipe development process, in accordance with an embodiment.

Referring now to FIG. 4, a process flow diagram 450 is shown, in accordance with an embodiment. The process flow diagram 450 includes several different branches that can work together in order to provide high quality HOW analytics. A first branch of process flow diagram 450 illustrates a path when there is no existing data that can be incorporated into the model. The second and third branches of the process flow diagram 450 include an explore branch and an exploit branch, respectively. The explore branch allows for additional DoE design in order to more fully and completely map a HOW. The exploit branch is taken when the HOW model is more fully fleshed out and can be incorporated into the DoE of a process recipe.

Referring now to process flow diagram 450, the process may start at block 451. The first branch is made at decision 452, which determines if there is any prior data that can be incorporated into the HOW model. In the case where there is no prior data, the process flow diagram 450 proceeds to block 453 which is an experiment design module 453. In an embodiment, the experiment design module 453 may be a module for forming a DoE in order to investigate the operating window of a semiconductor processing tool. In an embodiment, the DoE may be populated using classical DoE design or space-filling DoE design. For example, a classical DoE design may include a partial factorial design or a RSM desgin. A space-filling DoE design may include a LHC, uniform, or sphere design.

After the experimental design module 453, constraints 454 may be applied to the DoE. The constraints may be existing known processing boundaries for a particular processing tool. In an embodiment, min-max constraints may be one example of the hardware constraint. For example, an electrostatic chuck (ESC) voltage may need to be between values a and b, or a bias needs to be above a value c. In another embodiment, the hardware constraints may include a linear constraint. For example, $\alpha*Bias+\beta*ESC_v>c$. In yet another embodiment, the hardware constraints may include non-linear constraints, such as, $\log(P)+1/Bias>d$. The constraints 454 may be further adjusted based on input from a physics based models interface 457.

After the constraints 454 and physics based models from the physics based model interface 457 are applied to the DoE, a data block 455 may be generated. The data block 455 may include a ranked DoE to provide better guidance during process recipe development. The data block 455 may also include one or more high-dimensional visualizations, such as those described in greater detail above.

In an embodiment, the data block 455 may then be used as an input back to the decision block 452. Now, since there is existing data, the Yes branch may be taken. The first block on the Yes branch may include an operation 458 to incorporate prior data into the system. For example, prior data such as the data from block 455 may be added to a database for use by the HOW modelling module 463. A standardized input 462 may be generated and stored in the database.

In some embodiments, the standardized input 462 may be analyzed by the physics based models interface 457 before being processed by the HOW modelling module 463. The physics based models interface 457 may include one or more physics based models. For example, plasma based models (e.g., Paschen breakdown voltage, Debye length, IEDF, etc.), thermal based models (e.g., ESC temperature, lid temperature, wall temperature, etc.), and/or fluidic flow models (e.g., boundary layer, pressure uniformity, etc.) can be used.

After data is incorporated into the system, the process flow diagram 450 may continue to the HOW modeling module 463. The HOW modeling module 463 may be used to generate a HOW model. In a particular embodiment, a GPR model is generated. In another embodiment, a GLM is generated. In other embodiments, machine learning (ML), or physics informed machine learning (PIML) are generated. However, it is to be appreciated that different modeling architectures, and/or more than one model architecture may be generated by the HOW modeling module 463. The HOW model may be used to identify where additional information may be needed in order to fully and accurately map the HOW.

In an embodiment, the process flow diagram 450 may continue to a decision block 464 where an optimization mode is determined. The options for the optimization mode are an explore mode (branch 465) or an exploit mode (branch 466). The explore mode may be selected when more information about the HOW is desired, and the exploit mode may be selected once the HOW model is adequately developed and is now ready to be used in recipe development.

In an embodiment, the explore mode (branch 465) goes back to the experiment design module 453. At the experiment design module 453 an additional DoE can be designed that more closely targets the areas of the HOW model that have low confidence intervals and/or limited data is available. The DoE can be run through the constraints 454 and have physics based information added by the physics based models interface 457 in order to develop a new information block 455. The loop may then continue back to decision block 452, and the process can be repeated.

In an embodiment, the exploit mode (branch 466) continues to an optimization module 467. The optimization module 467 may include a constraints module 469, a weighting module 470, and a non-linear algorithm module 468. The different modules may be used together in order to generate a ranked DoE and/or high-dimensional visualizations in block 455. The ranked DoE and high-dimensional visualizations may then be used in subsequent recipe development in order to avoid hardware stability issues during margin testing or the like.

Figure 5:
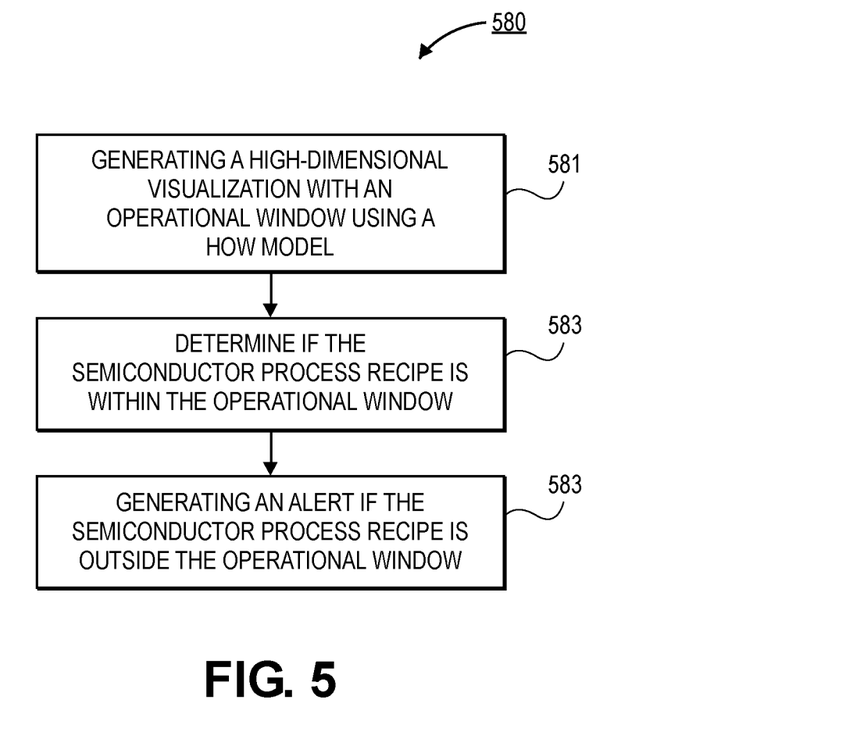
FIG. 5 is a process flow diagram depicting the use of a HOW model to verify if a process recipe is within the operational window of the processing tool, in accordance with an embodiment.

Referring now to FIG. 5, a process flow diagram describing a process 580 to use HOW analytics to verify a process recipe is shown, in accordance with an embodiment. In an embodiment, the process 580 may begin with operation 581, which comprises generating a high-dimensional visualization with an operational window using a HOW model. For example, the operation 581 may be implemented in accordance with any of the processes described above, such as process 340 or process 450. Particularly, one or more high-dimensional visualizations may provide a quick and easy to utilize visual representation of the operational window. For example, the high-dimensional visualization may be similar to the HOW map 230 in FIG. 2B.

In an embodiment, the high-dimensional visualization may provide an operational window. That is, any recipe with parameters within the operational window may be expected to not lead to hardware stability issues. In an embodiment, an optimal hardware operating window may also be provided in the high-dimensional visualization. The optimal hardware operating window may indicate that there is an even lower chance of hardware stability issues. The high-dimensional visualization may be provided on a display device (e.g., a computer display). The display device may be coupled to a computer that is implementing the process 580. In some embodiments, the computer may be coupled to the processing tool for which the process recipe is intended to run on. Though, in other embodiments, the display device may be coupled to any computer that can implement process 580.

In an embodiment, the process 580 may continue with operation 582, which comprises determining if the semiconductor process recipe is within the operational window. In some embodiments, the process recipe may be entirely within the optimal hardware operating window or the process recipe may also extend into the larger operational window. In other embodiments, the process recipe may extend out of the operational window.

In an embodiment, the process 580 may continue with operation 583, which comprises generating an alert if the semiconductor process recipe is outside the operational window. For example, the alert may be a visual representation on the display, or even an audible noise to indicate the danger. In some embodiments, the semiconductor process recipe may be automatically altered to return to the semiconductor process recipe into the operational window. In other embodiments, the alert notifies the process engineer that the semiconductor process recipe needs to be altered. In some embodiments, an alert may prevent the process from moving forward until the condition causing the alert is corrected. In other embodiments, the alert may be bypassed by the process engineer.

Figure 6:
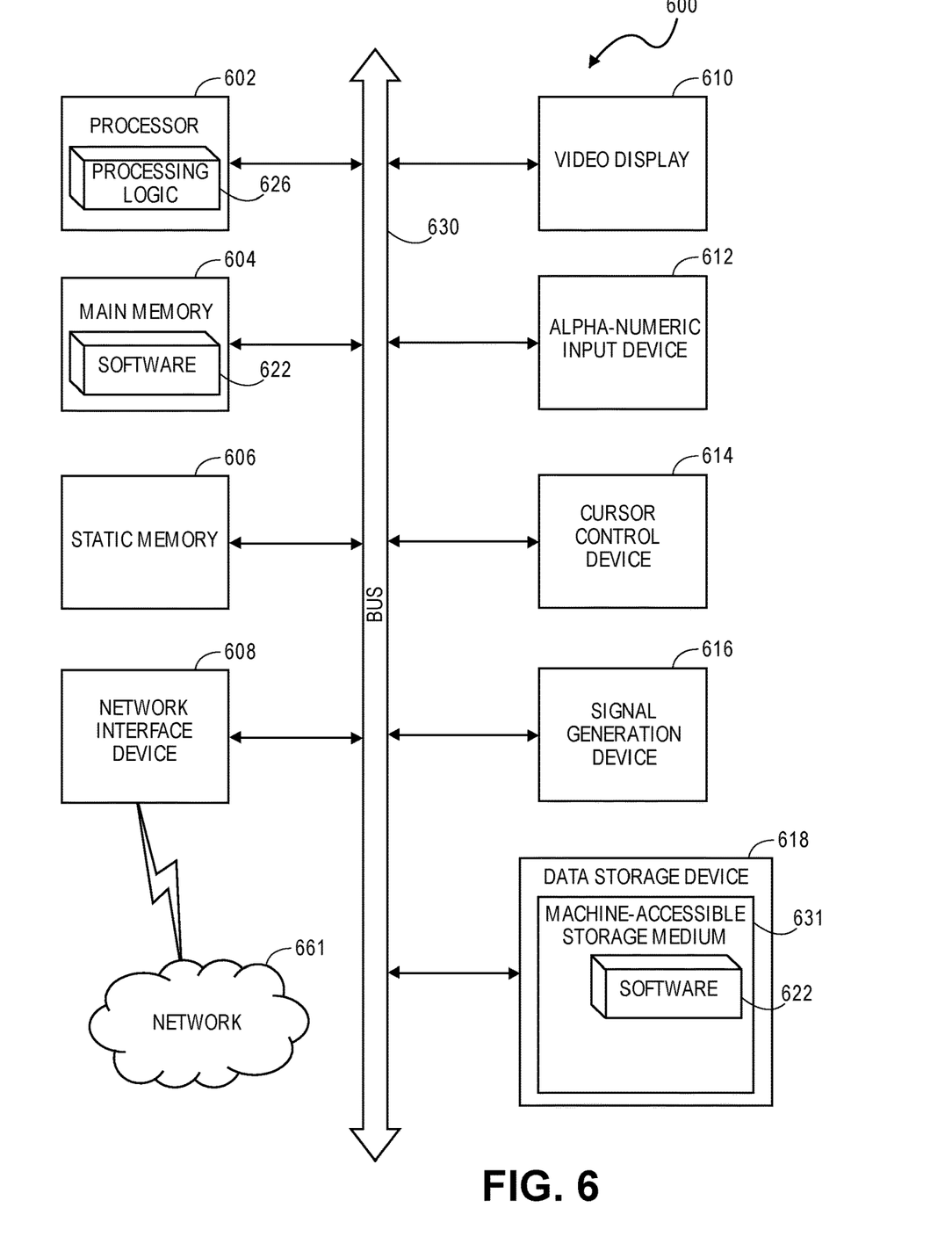
FIG. 6 illustrates a block diagram of an exemplary computer system that may be used in conjunction with a processing tool, in accordance with an embodiment.

Referring now to FIG. 6, a block diagram of an exemplary computer system 600 of a processing tool is illustrated in accordance with an embodiment. In an embodiment, computer system 600 is coupled to and controls processing in the processing tool. Computer system 600 may be connected (e.g., networked) to other machines in a Local Area Network (LAN), an intranet, an extranet, or the Internet. Computer system 600 may operate in the capacity of a server or a client machine in a client-server network environment, or as a peer machine in a peer-to-peer (or distributed) network environment. Computer system 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 600, the term "machine" shall also be taken to include any collection of machines (e.g., computers) that individually or jointly execute a set (or multiple sets) of instructions to perform any one or more of the methodologies described herein.

Computer system 600 may include a computer program product, or software 622, having a non-transitory machine-readable medium having stored thereon instructions, which may be used to program computer system 600 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 600 includes a system processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

System processor 602 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 602 may also be one or more special-purpose processing devices such as an application specific integrated circuit (ASIC), a field programmable gate array (FPGA), a digital signal system processor (DSP), network system processor, or the like. System processor 602 is configured to execute the processing logic 626 for performing the operations described herein.

The computer system 600 may further include a system network interface device 608 for communicating with other devices or machines. The computer system 600 may also include a video display unit 610 (e.g., a liquid crystal display (LCD), a light emitting diode display (LED), or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-accessible storage medium 632 (or more specifically a computer-readable storage medium) on which is stored one or more sets of instructions (e.g., software 622) embodying any one or more of the methodologies or functions described herein. The software 622 may also reside, completely or at least partially, within the main memory 604 and/or within the system processor 602 during execution thereof by the computer system 600, the main memory 604 and the system processor 602 also constituting machine-readable storage media. The software 622 may further be transmitted or received over a network 620 via the system network interface device 608. In an embodiment, the network interface device 608 may operate using RF coupling, optical coupling, acoustic coupling, or inductive coupling.

While the machine-accessible storage medium 632 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. A method for use with a semiconductor processing tool, comprising:
    configuring the semiconductor processing tool;
    running a benchmark test on the semiconductor processing tool;
    providing hardware operating window (HOW) analytics including an operational window for the semiconductor processing tool, wherein the HOW analytics includes a high-dimensional visualization comprising a three-dimensional map of hardware constraints, the three-dimensional map of hardware constraints comprising a plurality of process parameters, each process parameter including a maximum value and a minimum value for a set of component specifications for the semiconductor processing tool to define the operational window of the semiconductor processing tool;
    generating a design of experiment (DoE) using the HOW analytics;
    implementing process optimization;
    releasing an iteration of the process recipe and determining if the process recipe fits in the operational window for the semiconductor processing tool; and
    if the process recipe fits in the operational window for the semiconductor processing tool, margin testing the iteration of the process recipe.

2. The method of claim 1, wherein the HOW analytics includes a graph of a stability index.

3. The method of claim 1, wherein the HOW analytics is derived from data recorded previous to configuring the semiconductor processing tool.

4. The method of claim 1, wherein the process optimization and the DoE are repeated a plurality of times.

5. The method of claim 1, wherein the final recipe is confirmed after the margin testing is successful.

6. The method of claim 1, wherein the HOW analytics comprises a Gaussian process regression (GPR), machine learning (ML), or physics informed machine learning (PIL).

7. The method of claim 1, wherein the HOW analytics comprises a generalized linear model (GLM), machine learning (ML), or physics informed machine learning (PIML).

8. A method of developing a process recipe for a semiconductor processing tool, comprising:
   incorporating prior data recorded by the semiconductor processing tool into a system;
   generating a hardware operating window (HOW) model including an operational window for the semiconductor processing tool, wherein the HOW model includes a high-dimensional visualization comprising a three-dimensional map of hardware constraints, the three-dimensional map of hardware constraints comprising a plurality of process parameters, each process parameter including a maximum value and a minimum value for a set of component specifications for the semiconductor processing tool to define the operational window of the semiconductor processing tool; and
   exploring the HOW model, wherein exploring the HOW model comprises:
      generating a design of experiment (DoE) to fill gaps in the HOW model; and
      applying tool constraints to the DoE to generate a ranked DoE, wherein the ranked DoE is used to identify the process recipe and determine if the process recipe fits in the operational window for the semiconductor processing tool.

9. The method of claim 8, wherein physics based models are used to provide additional features that are used for recipe ranking and/or optimization.

10. The method of claim 8, wherein the DoE is a classic DoE or a space-filling DoE.

11. The method of claim 8, wherein the HOW model comprises a Gaussian process regression (GPR), a generalized linear model (GLM), or other machine learning (ML) models.

12. The method of claim 8, further comprising:
   exploiting the HOW model, wherein exploiting the HOW model comprises:
      using an optimization module to apply constraints and weighting to the HOW model; and
      obtaining a ranked DoE and a high-dimensional visualization from the optimization module.

13. The method of claim 8, wherein a physics based model is used in the generation of the HOW model.

14. A non-transitory computer readable medium having instructions stored thereon that, when executed by a processor, cause the processor to perform a method of validating a semiconductor process recipe, comprising:
   generating a high-dimensional visualization using a hardware operating window (HOW) model, wherein the high-dimensional visualization comprises an operational window for a semiconductor processing tool, the operational window comprising a three-dimensional map of hardware constraints, the three-dimensional map of hardware constraints comprising a plurality of process parameters, each process parameter including a maximum value and a minimum value for a set of component specifications for the semiconductor processing tool to define the operational window of the semiconductor processing tool; and
   determining if the semiconductor process recipe is within the operational window for the semiconductor processing tool.

15. The non-transitory computer readable medium of claim 14, further comprising:
   generating an alert when the semiconductor process recipe is outside of the operational window.

16. The non-transistor computer readable medium of claim 14, wherein the HOW model comprises a Gaussian process regression (GPR), a generalized linear model (GLM), machine learning (ML), or physics informed machine learning (PIML).

17. The non-transistor computer readable medium of claim 14, wherein an optimal hardware window is within the operational window, and wherein the method further comprises generating an alert when the semiconductor process recipe is outside the optimal hardware window.

* * * * *